(12) United States Patent
Je

(10) Patent No.: US 9,776,593 B2
(45) Date of Patent: Oct. 3, 2017

(54) CURTAIN AIRBAG APPARATUS

(71) Applicant: HYUNDAI MOBIS Co., Ltd., Yongin-si, Gyeonggi-do (KR)

(72) Inventor: Hyung Ho Je, Yongin-si, Gyeonggi-do (KR)

(73) Assignee: HYUNDAI MOBIS CO., LTD., Yongin-si, Gyeonggi-do (KR)

( * ) Notice: Subject to any disclaimer, the term of this patent is extended or adjusted under 35 U.S.C. 154(b) by 92 days.

(21) Appl. No.: 14/834,601

(22) Filed: Aug. 25, 2015

(65) Prior Publication Data
US 2016/0059816 A1  Mar. 3, 2016

(30) Foreign Application Priority Data

Aug. 27, 2014  (KR) .................. 10-2014-0112546

(51) Int. Cl.
| | | |
|---|---|---|
| *B60R 21/232* | (2011.01) | |
| *B60R 21/2338* | (2011.01) | |
| *B60R 21/237* | (2006.01) | |
| *B60R 21/00* | (2006.01) | |

(52) U.S. Cl.
CPC ........ *B60R 21/232* (2013.01); *B60R 21/2338* (2013.01); *B60R 21/237* (2013.01); *B60R 2021/0009* (2013.01); *B60R 2021/0048* (2013.01); *B60R 2021/23386* (2013.01)

(58) Field of Classification Search
CPC . B60R 21/232; B60R 21/2338; B60R 21/237; B60R 2021/23386; B60R 2021/0048; B60R 2021/0009; B60R 2021/23308; B60R 2021/23316

USPC ............................................. 280/728.2, 729
See application file for complete search history.

(56) References Cited

U.S. PATENT DOCUMENTS

| | | | |
|---|---|---|---|
| 7,500,694 B2* | 3/2009 | Heudorfer | B60R 21/232 280/729 |
| 8,789,846 B2* | 7/2014 | Wipasuramonton | B60R 21/232 280/730.2 |
| 9,114,776 B2* | 8/2015 | Thomas | B60R 21/2338 |
| 9,505,373 B2* | 11/2016 | Moon | B60R 21/232 |
| 2005/0206138 A1* | 9/2005 | Breuninger | B60R 21/231 280/729 |
| 2013/0234422 A1* | 9/2013 | Wipasuramonton | B60R 21/232 280/730.2 |
| 2013/0270805 A1 | 10/2013 | Kruse et al. | |

(Continued)

FOREIGN PATENT DOCUMENTS

| | | |
|---|---|---|
| CN | 101062674 A | 10/2007 |
| CN | 101186196 A | 5/2008 |
| CN | 101767567 A | 7/2010 |

OTHER PUBLICATIONS

Mar. 31, 2017, Chinese Office Action for related CN application No. 201510535166.8.

*Primary Examiner* — Karen Beck
(74) *Attorney, Agent, or Firm* — Paratus Law Group, PLLC

(57) ABSTRACT

Disclosed is a curtain airbag which has at least one expandable portion formed at a front side thereof; and a tether panel which is coupled to the curtain airbag so as to be disposed on one surface of the curtain airbag, and tightened as the curtain airbag is inflated, so as to allow the at least one expandable portion to protrude toward the other surface that is directed toward the inside of an interior of a vehicle.

10 Claims, 7 Drawing Sheets

(56) References Cited

U.S. PATENT DOCUMENTS

| | | | |
|---|---|---|---|
| 2015/0307057 A1* | 10/2015 | Moon | B60R 21/232 |
| | | | 280/728.2 |
| 2016/0031404 A1* | 2/2016 | Takedomi | B60R 21/2334 |
| | | | 280/729 |
| 2016/0059816 A1* | 3/2016 | Je | B60R 21/232 |
| | | | 280/730.2 |
| 2016/0107602 A1* | 4/2016 | Nakashima | B60R 21/233 |
| | | | 280/728.2 |
| 2016/0114754 A1* | 4/2016 | Kawamura | B60R 21/2334 |
| | | | 280/728.2 |
| 2016/0221527 A1* | 8/2016 | Sugimori | B60R 21/232 |
| 2017/0008478 A1* | 1/2017 | Kim | B60R 21/232 |

\* cited by examiner

CURTAIN AIRBAG APPARATUS

CROSS-REFERENCE TO RELATED APPLICATIONS

The present application claims priority to Korean Patent Application Number 10-2014-0112546 filed Aug. 27, 2014, the entire contents of which the application is incorporated herein for all purposes by this reference.

TECHNICAL FIELD

The present invention relates to a curtain airbag apparatus, and more particularly, to a curtain airbag apparatus that is installed to be elongated in a front and rear direction of a vehicle.

BACKGROUND

In general, curtain airbags are installed at left and right sides of a vehicle, respectively. In more detail, the curtain airbag is installed on a side inner panel, which is disposed at an upper side of a lateral side of the vehicle, so as to be elongated in a front and rear direction of the vehicle.

The curtain airbag is deployed from the upper side to the lower side at the time of an accident of the vehicle, and disposed between a door of the vehicle and a head of an occupant to protect the head of the occupant.

FIG. 1 is a view illustrating a curtain airbag according to the related art when viewed from the top side.

Referring to FIG. 1, a driver airbag 2a is further installed in a steering wheel in the vehicle. In addition, a passenger airbag (not illustrated) for protecting an occupant seated in a front passenger seat is also installed at an upper side of a glove box disposed in front of the front passenger seat in the vehicle.

Typically, the driver airbag 2a and the passenger airbag are deployed at the time of a head-on collision of the vehicle, a curtain airbag 1a is deployed at the time of a broadside collision of the vehicle or at the time of a rollover accident of the vehicle, and the driver airbag 2a, the passenger airbag, and the curtain airbag 1a are deployed at the time of an oblique collision of the vehicle.

When the vehicle collides with an object as described above, the upper body of the occupant is bent forward by inertial force, and a head 3a of the occupant is moved forward. Particularly, at the time of an oblique collision of the vehicle, there are problems in that the head 3a of the occupant obliquely moves forward, passes between the driver airbag 2a and the curtain airbag 1a, and collides with a hard structure of the vehicle, or passes between the passenger airbag and the curtain airbag 1a, and collides with a hard structure of the vehicle.

SUMMARY

The present invention has been made in an effort to provide a curtain airbag apparatus capable of preventing a head of an occupant from being moved forward and colliding with a structure of a vehicle at the time of an oblique collision of the vehicle.

Technical problems of the present invention are not limited to the aforementioned technical problem, and other technical problems, which are not mentioned above, may be clearly understood by those skilled in the art from the following descriptions.

An exemplary embodiment of the present invention provides a curtain airbag apparatus including: a curtain airbag which has at least one expandable portion formed at a front side thereof; and a tether panel which is coupled to the curtain airbag so as to be disposed on one surface of the curtain airbag, and tightened as the curtain airbag is inflated, so as to allow the at least one expandable portion to protrude toward the other surface that is directed toward the inside of an interior of a vehicle.

Other detailed matters of the exemplary embodiment are included in the detailed description and the drawings.

According to the curtain airbag apparatus according to the exemplary embodiment of the present invention, the tether panel allows the at least one expandable portion formed at the front side of the curtain airbag to protrude toward the inside of the interior of the vehicle, and the at least one expandable portion protrudes toward a position where a driver airbag is inflated or a position where a passenger airbag is inflated, thereby preventing a head of a driver from colliding with a hard structure of the vehicle after passing between the driver airbag and the curtain airbag, and preventing a head of a passenger from colliding with a hard structure of the vehicle after passing between the passenger airbag and the curtain airbag.

The effect of the present invention is not limited to the aforementioned effect, and other effects, which are not mentioned above, will be clearly understood by those skilled in the art from the claims.

DETAILED DESCRIPTION

Figure 1:
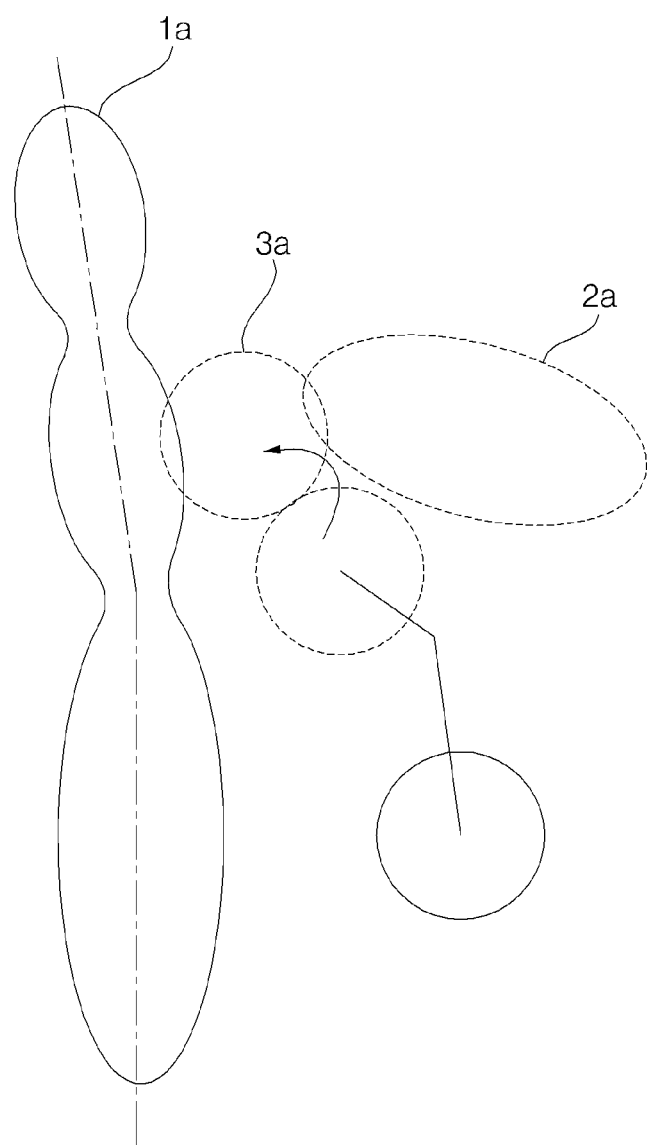
FIG. 1 is a view illustrating a curtain airbag according to the related art when viewed from the top side.

Advantages and features of the present invention and methods of achieving the advantages and features will be clear with reference to exemplary embodiments described in detail below together with the accompanying drawings. However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims. Like reference numerals indicate like elements throughout the specification.

Hereinafter, a curtain airbag apparatus according to an exemplary embodiment of the present invention will be described with reference to the drawings.

Figure 2:
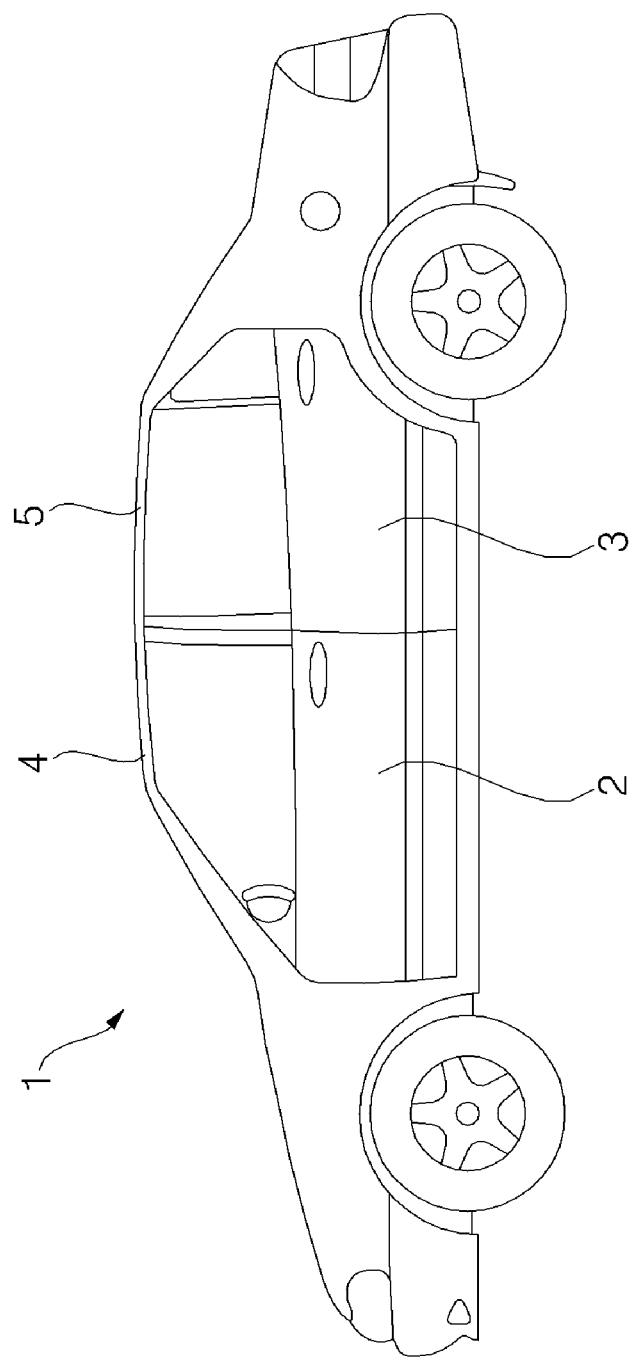
FIG. 2 is a side view illustrating a vehicle in which a curtain airbag apparatus according to an exemplary embodiment of the present invention is installed.
Figure 3:
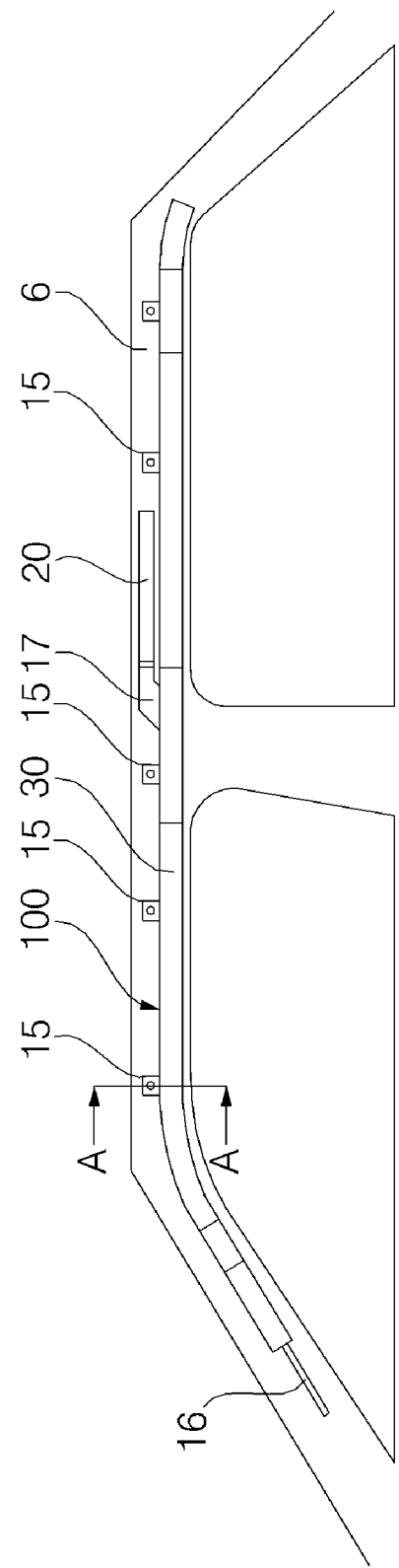
FIG. 3 is a view illustrating a state in which the curtain airbag apparatus according to the exemplary embodiment of the present invention is installed in the vehicle.
Figure 4:
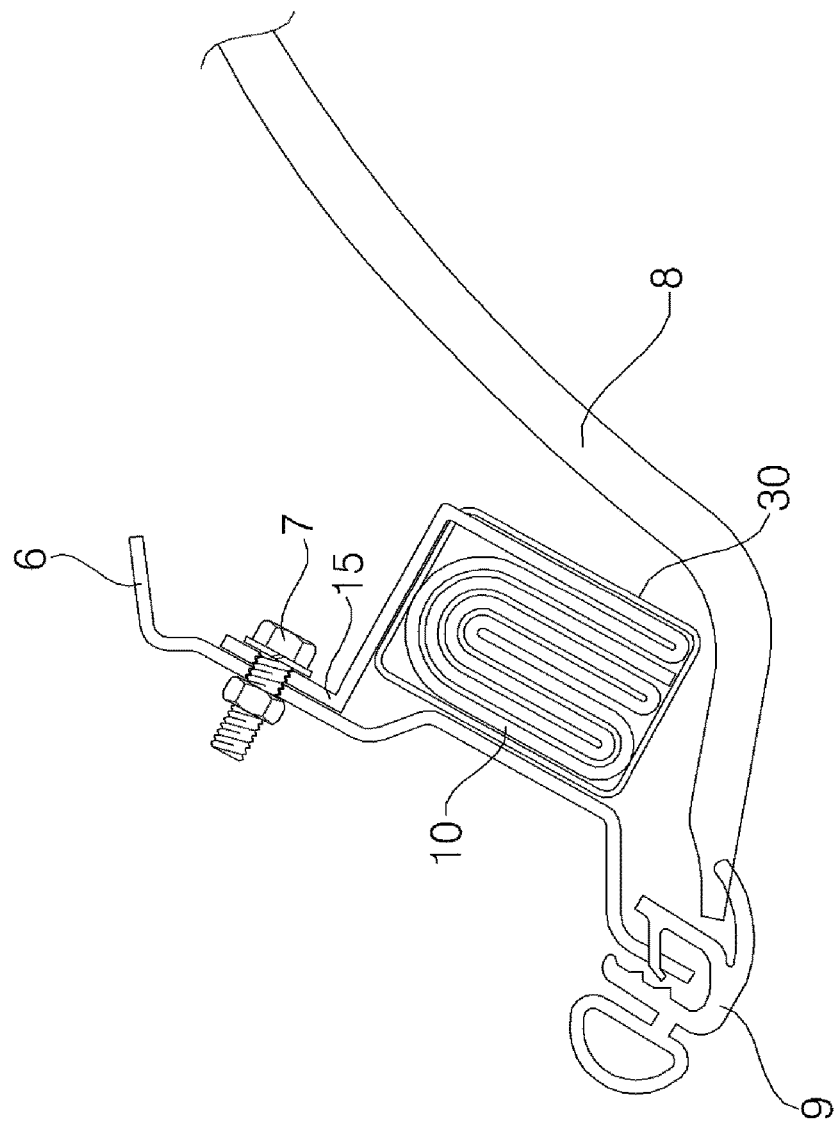
FIG. 4 is a cross-sectional view taken along line A-A of FIG. 3.
Figure 5:
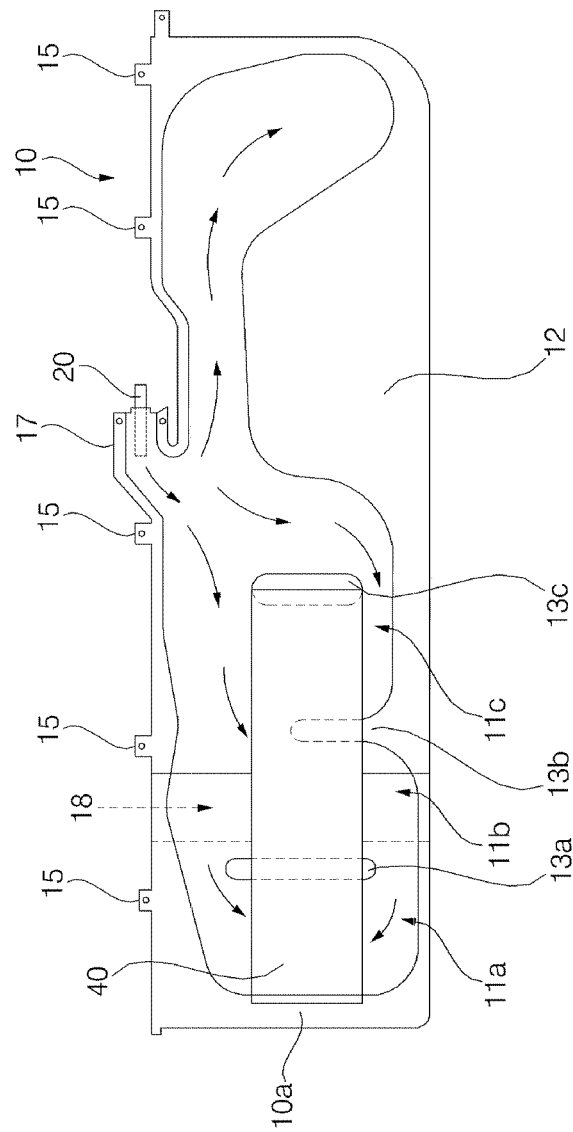
FIG. 5 is a view illustrating a curtain airbag and a tether panel of the curtain airbag apparatus according to the exemplary embodiment of the present invention.

FIG. 2 is a side view illustrating a vehicle in which a curtain airbag apparatus according to an exemplary embodiment of the present invention is installed, FIG. 3 is a view illustrating a state in which the curtain airbag apparatus according to the exemplary embodiment of the present invention is installed in the vehicle, FIG. 4 is a cross-sectional view taken along line A-A of FIG. 3, and FIG. 5 is a view illustrating a curtain airbag and a tether panel of the curtain airbag apparatus according to the exemplary embodiment of the present invention.

Referring to FIGS. 2 to 5, a curtain airbag apparatus 100 according to an exemplary embodiment of the present invention is mounted at an upper side of a vehicle 1 so as to be elongated in a front and rear direction.

A front door 2 and a rear door 3, through which occupants (including both a driver and a passenger) get in and out of the vehicle 1, are provided at a lateral side of the vehicle 1. An A-pillar 4 is disposed at an upper side of the front door 2, a C-pillar 5 is disposed at an upper side of the rear door 3, and a B-pillar (not illustrated) is disposed between the front door 2 and the rear door 3 so as to be elongated in an up and down direction.

The curtain airbag apparatus 100 is mounted on a side inner panel 6, which is disposed inside the A-pillar 4 and the C-pillar 5, so as to be elongated in the front and rear direction. Hereinafter, the side inner panel 6 will be described as a vehicle body 6.

The curtain airbag apparatus 100 includes an inflator 20 which generates gas, and a curtain airbag 10 which is connected with the inflator 20 and inflated and deployed when gas generated by the inflator 20 flows into the curtain airbag 10, to protect a head of the occupant.

The curtain airbag 10 is folded and then encapsulated in a cushion cover 30, and then is mounted on the vehicle body 6, which is disposed inside the A-pillar 4 and the C-pillar 5, by fastening members 7. A plurality of mounting tabs 15, which is mounted on the vehicle body 6 by the fastening members 7, is formed at an upper end of the curtain airbag 10.

The cushion cover 30 may be made of a flexible fabric material identical to a material of the curtain airbag 10. Holes (not illustrated) through which the mounting tabs 15 come out are formed at an upper side of the cushion cover 30, such that the mounting tabs 15 come out through the holes to the outside of the cushion cover 30, and then are mounted on the vehicle body 6 by means of the fastening members 7. In addition, a tear line (not illustrated), which is torn by expansive force of the curtain airbag 10, is formed at a lower side of the cushion cover 30. That is, the curtain airbag 10 may tear the tear line while being inflated, and then the curtain airbag 10 may be deployed while coming out to the outside of the cushion cover 30.

The curtain airbag apparatus 100 is covered by a head liner 8 such that the curtain airbag apparatus 100 is invisible from the interior of the vehicle. Here, the head liner 8 refers to a member that is made of a fabric material and covers a roof panel (not illustrated) of the vehicle 1 from the interior of the vehicle. The head liner 8 is caught by a weather strip 9 disposed at a lower end of the vehicle body 6, and when the curtain airbag 10 is inflated, the head liner 8 is detached and separated from the weather strip 9 by expansive force of the curtain airbag 10, and the curtain airbag 10 comes out through a gap between the weather strip 9 and the head liner 8 and then is deployed, such that the curtain airbag 10 is disposed between the head of the occupant and the front door 2 and the rear door 3, thereby protecting the head of the occupant.

An A-pillar tether 16, which is fixed to the vehicle body 6 disposed inside the A-pillar 4, is coupled to a front end of the curtain airbag 10. Therefore, a front side of the curtain airbag is restricted by the A-pillar tether 16 when the curtain airbag 10 is inflated, such that the curtain airbag 10 may be deployed without being biased rearward.

Meanwhile, a gas inlet unit 17, which is coupled to the inflator 20, is formed at a center of an upper end of the curtain airbag 10. A tip portion of the inflator 20, through which gas is discharged, is disposed to be inserted into the gas inlet unit 17. The curtain airbag 10 may be inflated and deployed when gas generated by the inflator 20 flows into a chamber of the curtain airbag 10 through the gas inlet unit 17.

The front side of the curtain airbag 10 based on the gas inlet unit 17 is an area that protects an occupant seated in a front seat, and the rear side of the curtain airbag 10 based on the gas inlet unit 17 is an area that protects an occupant seated in a rear seat.

The curtain airbag 10 has at least one expandable portion 11a, 11b, or 11c that is formed at the front side based on the gas inlet unit 17 and inflated when gas flows into the at least one expandable portion 11a, 11b, or 11c. In the present exemplary embodiment, three expandable portions 11a, 11b, and 11c are formed and include a first expandable portion 11a which is disposed at a foremost side, a second expandable portion 11b which is disposed rearward of the first expandable portion 11a, and a third expandable portion 11c which is disposed rearward of the second expandable portion 11b.

Meanwhile, a quadrangular tether panel 40 is coupled to one surface 12 of the curtain airbag 10. The tether panel 40 is coupled at the front side of the curtain airbag 10 which is disposed further forward than the gas inlet unit 17, and disposed on the one surface 12 of the curtain airbag 10 which is a surface directed toward the outside of the interior of the vehicle.

The tether panel 40 is tightened as the curtain airbag 10 is inflated, and allows the at least one expandable portion 11a, 11b, or 11c to protrude toward the other surface that is a surface directed toward the inside of the interior of the vehicle. The at least one expandable portion 11a, 11b, or 11c protrudes toward the inside of the interior of the vehicle to block a gap between a driver airbag and the curtain airbag 10 or block a gap between a passenger airbag and the curtain airbag 10. In the present exemplary embodiment, the first expandable portion 11a protrudes toward a position where the driver airbag is fully inflated or protrudes toward a position where the passenger airbag is fully inflated, thereby blocking a gap between the driver airbag and the curtain airbag 10 or blocking a gap between the passenger airbag and the curtain airbag 10.

Meanwhile, the curtain airbag 10 has at least one non-expandable portion 13a, 13b, or 13c formed further forward than the gas inlet unit 17. The at least one non-expandable portion 13a, 13b, or 13c is a portion that is not inflated because gas does not flow into the at least one non-expandable portion 13a, 13b, or 13c. Three non-expandable portions 13a, 13b, and 13c are formed and disposed to be spaced apart from each other in the front and rear direction. That is, the non-expandable portions 13a, 13b, and 13c include a first non-expandable portion 13a which is disposed at a foremost side, a second non-expandable portion 13b which is disposed to be spaced rearward from the first non-expandable portion 13a, and a third non-expandable portion 13c which is disposed to be spaced rearward from the second non-expandable portion 13b.

The first non-expandable portion 13a is disposed between the first expandable portion 11a and the second expandable portion 11b, the second non-expandable portion 13b is disposed between the second expandable portion 11b and the third expandable portion 11c, and the third non-expandable portion 13c is disposed rearward of the third expandable portion 11c.

The first non-expandable portion 13a is formed to be elongated in the up and down direction, and gas flowing into the curtain airbag 10 passes through upper and lower sides of the first non-expandable portion 13a while being moved forward.

The second non-expandable portion 13b extends from a lower end of the curtain airbag 10 and protrudes upward. Gas flowing into the curtain airbag 10 passes only through an upper side of the second non-expandable portion 13b while being moved forward.

The third non-expandable portion 13c is formed to be elongated in the up and down direction, and gas flowing into the curtain airbag 10 passes through upper and lower sides of the third non-expandable portion 13c while being moved forward.

An upper end of the first non-expandable portion 13a is disposed to be higher than an upper end of the third non-expandable portion 13c, and a lower end of the first non-expandable portion 13a is disposed to be lower than a lower end of the third non-expandable portion 13c. Further, an upper end of the second non-expandable portion 13b is disposed to be lower than the upper end of the first non-expandable portion 13a and the upper end of the third non-expandable portion 13c, and disposed to be higher than the lower end of the first non-expandable portion 13a and the lower end of the third non-expandable portion 13c.

One end of the tether panel 40 is coupled to a front end 10a of the curtain airbag 10, and the other end of the tether panel 40 is coupled to the third non-expandable portion 13c. In the present exemplary embodiment, the other end of the tether panel 40 is coupled to the third non-expandable portion 13c because the three non-expandable portions 13a, 13b, and 13c are formed, but the other end of the tether panel 40 may be coupled to the at least one non-expandable portion 13a, 13b, or 13c that is positioned rearward of the at least one expandable portion 11a, 11b, or 11c. For example, in a case in which only the first expandable portion 11a and the second expandable portion 11b are formed among the expandable portions 11a, 11b, and 11c, the one end of the tether panel 40 is coupled to the front end 10a of the curtain airbag 10, and the other end of the tether panel 40 is coupled to the second non-expandable portion 13b positioned rearward of the second expandable portion 11b.

Meanwhile, the curtain airbag 10 has a folded portion 18 that is folded and disposed further forward than the gas inlet unit 17. The folded portion 18 may be formed by folding the second expandable portion 11b, and the folded portion 18 is unfolded by gas flowing into the curtain airbag 10. The folded portion 18 will be described below.

Figure 6:
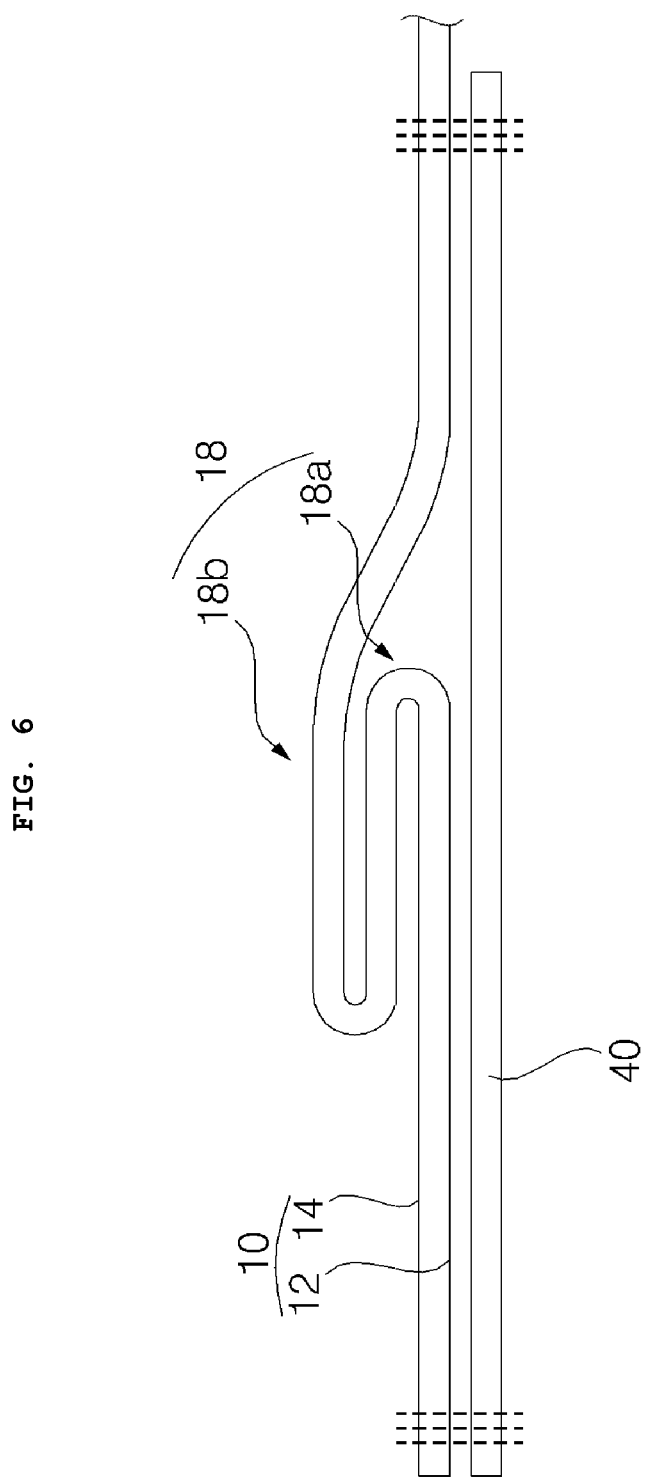
FIG. 6 is a view illustrating the curtain airbag and the tether panel illustrated in FIG. 5 when viewed from the top side.

FIG. 6 is a view illustrating the curtain airbag and the tether panel illustrated in FIG. 5 when viewed from the top side.

Referring to FIGS. 5 and 6, the curtain airbag 10 is manufactured by coupling two flexible panels by sewing. That is, the curtain airbag 10 includes an outer board 12, and an inner board 14 coupled to the outer board 12. The outer board 12 and the inner board 14 have the same size and structure. The curtain airbag 10 may be completely manufactured by spreading out the inner board 14 on a floor, spreading out and stacking the outer board 12 on the inner board 14, and thereafter sewing circumferences of the outer board 12 and the inner board 14. When gas flows into the curtain airbag 10 and the curtain airbag is deployed, the outer board 12 is disposed to be directed toward the front door 2 and the rear door 3, and the inner board 14 is disposed to be directed toward the inside of the interior of the vehicle. That is, the outer board 12 defines the one surface 12 of the curtain airbag 10, and the inner board 14 defines the other surface 14 of the curtain airbag 10.

Similar to the curtain airbag 10, the tether panel 40 is formed as a flexible panel. The tether panel 40 may be made of the same material as the curtain airbag 10. The tether panel 40 is disposed on the outer board 12 that is directed toward the front door 2 and the rear door 3.

Meanwhile, within a section where the tether panel 40 is coupled, a length of the curtain airbag 10 in the front and rear direction is longer than a length of the tether panel 40 in the front and rear direction. Therefore, while the curtain airbag 10 is being deployed, the tether panel 40 may be tightened while being pulled in the front and rear direction by the curtain airbag 10, and thereafter, the curtain airbag 10 is pulled in the front and rear direction by the tightened tether panel 40, such that the at least one expandable portion 11a, 11b, or 11c may protrude toward the inside of the interior of the vehicle.

The curtain airbag 10 includes the folded portion 18 that is folded so that the length of the curtain airbag 10 in the front and rear direction becomes equal to the length of the tether panel 40 in the front and rear direction within the section where the tether panel 40 is coupled to the curtain airbag 10.

The folded portion 18 includes a first folded portion 18a, and a second folded portion 18b. The first folded portion 18a is formed by bringing the other surfaces 14 into direct contact with each other. The second folded portion 18b extends from the first folded portion 18a and is formed by bringing the one surface 12 into direct contact with the one surface 12 of the first folded portion 18a.

An operation of the curtain airbag apparatus according to the exemplary embodiment of the present invention, which is configured as described above, will be described below.

Figure 7:
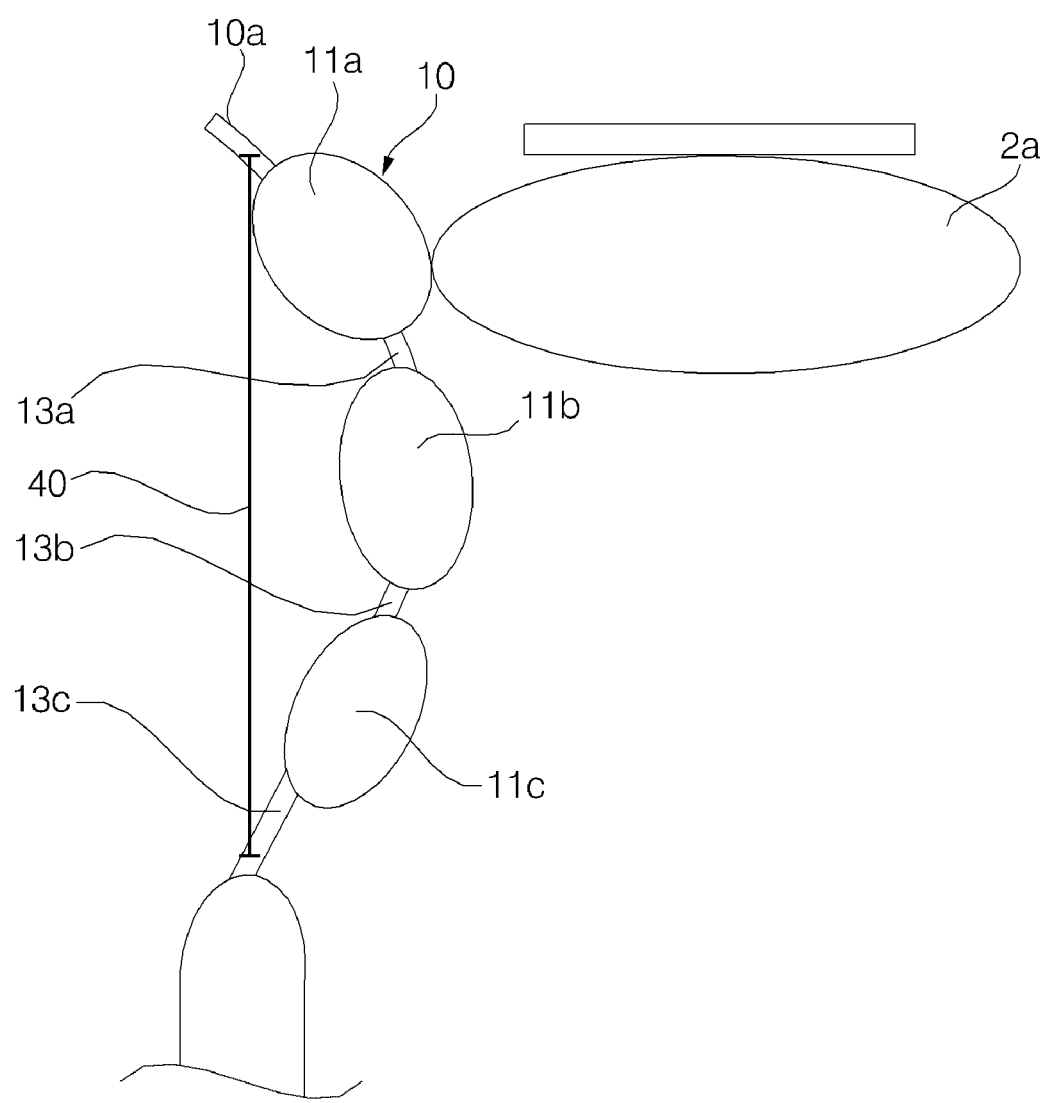
FIG. 7 is a view illustrating an operation of the curtain airbag apparatus according to the exemplary embodiment of the present invention.

FIG. 7 is a view illustrating an operation of the curtain airbag apparatus according to the exemplary embodiment of the present invention.

Referring to FIGS. 5 to 7, at the time of an accident of the vehicle 1, the inflator 20 generates and discharges gas. The gas discharged from the inflator 20 flows into the curtain airbag 10, and moves in the curtain airbag 10 in the front and rear direction.

Thereafter, a rear portion of the curtain airbag 10 is inflated by gas flowing rearward. At the same time, a front portion of the curtain airbag 10 is also inflated.

The gas moving forward in the curtain airbag 10 passes through the upper and lower ends of the third non-expandable portion 13c disposed to be closest to the gas inlet unit 17, and then continues to be moved forward while passing through the upper end of the second non-expandable portion 13b. Further, the gas passing through the upper end of the second non-expandable portion 13b flows into the front side of the curtain airbag 10 while passing through the upper and lower ends of the first non-expandable portion 13a, such that gas completely flows into the front side of the curtain airbag 10. During these processes, the tether panel 40 is tightened while being pulled by the curtain airbag 10, and the tightened tether panel 40 pulls the curtain airbag 10 to prevent the curtain airbag 10 from being deployed in the front and rear direction any more. Therefore, all of the first expandable portion 11a, the second expandable portion 11b, and the third expandable portion 11c, which are formed in the curtain airbag 10, protrude toward the other surface 14 that is directed toward the inside of the interior of the vehicle. In the present exemplary embodiment, since the one end of the tether panel 40 is coupled to the front end of the curtain airbag 10 and the other end of the tether panel 40 is coupled to the third non-expandable portion 13c, the second expandable portion 11b, which is disposed between the first expandable portion 11a and the third expandable portion 11c, further protrudes toward the other surface 14 than the first expandable portion 11a and the third expandable portion 11c.

When the first expandable portion 11a, the second expandable portion 11b, and the third expandable portion 11c protrude toward the inside of the interior of the vehicle as described above, the first expandable portion 11a may come into contact with the inflated driver airbag 2a or the inflated passenger airbag. Therefore, the first expandable portion 11a blocks a gap between the curtain airbag and the driver airbag 2a or a gap between the curtain airbag and the passenger airbag, and as a result, the head of the driver is not trapped in a gap between the driver airbag 2a and the curtain airbag 10, and the head of the passenger also is not trapped in a gap between the passenger airbag and the curtain airbag 10.

Since the second expandable portion 11b further protrudes toward the inside of the interior of the vehicle than the first expandable portion 11a, it is possible to prevent the head of the driver from being moved forward toward a portion between the first expandable portion 11a and the driver airbag 2a, and it is possible to prevent the head of the passenger from being moved forward toward a portion between the first expandable portion 11a and the passenger airbag.

As described above, according to the curtain airbag apparatus according to the exemplary embodiment of the present invention, the tether panel 40 allows the at least one expandable portion 11a, 11b, or 11c formed at the front side of the curtain airbag 10 to protrude toward the inside of the interior of the vehicle, and the at least one expandable portion 11a, 11b, or 11c protrudes toward a position where the driver airbag 2a is inflated or a position where the passenger airbag is inflated, thereby preventing the head of the driver from colliding with a hard structure of the vehicle 1 after passing between the driver airbag 2a and the curtain airbag 10, and preventing the head of the passenger from colliding with a hard structure of the vehicle 1 after passing between the passenger airbag and the curtain airbag 10.

It may be understood by a person skilled in the art that the present invention may be carried out in other specific forms without changing the technical spirit or the essential characteristics. Thus, it should be appreciated that the exemplary embodiments described above are intended to be illustrative in every sense, and not restrictive. The scope of the present invention is represented by the claims to be described below rather than the detailed description, and it should be interpreted that all the changes or modified forms, which are derived from the meaning and the scope of the claims, and the equivalents thereto, are included in the scope of the present invention.

What is claimed is:

1. A curtain airbag apparatus comprising:
   a curtain airbag including:
   a gas inlet unit formed at an upper end of the curtain airbag and coupled to an inflator which generates gas;
   at least one expandable portion formed at a front side of the curtain airbag, and including a first expandable portion disposed at a foremost side, a second expandable portion disposed rearward of the first expandable portion, and a third expandable portion disposed rearward of the second expandable portion; and
   at least one non-expandable portion including a first non-expandable portion disposed between the first expandable portion and the second expandable portion, a second non-expandable portion disposed between the second expandable portion and the third expandable portion, and a third non-expandable portion disposed rearward of the third expandable portion; and
   a tether panel which is coupled to one surface of the curtain airbag and tightened as the curtain airbag is inflated, so as to allow the at least one expandable portion to protrude toward the other surface that is directed toward the inside of an interior of a vehicle,
   wherein the first non-expandable portion, the second non-expandable portion, and the third non-expandable portion are disposed further forward than the gas inlet unit, the first non-expandable portion is formed to be elongated in an up and down direction, gas, which flows into the curtain airbag through the gas inlet unit, passes through upper and lower sides of the first non-expandable portion, the second non-expandable portion extends from a lower end of the curtain airbag and protrudes upward, gas, which flows into the curtain airbag through the gas inlet unit, passes only through an upper side of the second non-expandable portion, the third non-expandable portion is formed to be elongated in the up and down direction, and gas, which flows into the curtain airbag through the gas inlet unit, passes through upper and lower sides of the third non-expandable portion.

2. The curtain airbag apparatus of claim 1, wherein one end of the tether panel is coupled to a front end of the curtain airbag, and the other end of the tether panel is coupled to the at least one non-expandable portion.

3. The curtain airbag apparatus of claim 2, wherein the one end of the tether panel is coupled to the front end of the curtain airbag, and the other end of the tether panel is coupled to the third non-expandable portion.

4. The curtain airbag apparatus of claim 3, wherein all of the first expandable portion, the second expandable portion, and the third expandable portion protrude toward the other surface.

5. The curtain airbag apparatus of claim 4, wherein the second expandable portion further protrudes toward the other surface than the first expandable portion and the third expandable portion.

6. The curtain airbag apparatus of claim 3, wherein the first expandable portion protrudes toward a position where a driver airbag is inflated or a position where a passenger airbag is inflated.

7. The curtain airbag apparatus of claim 1, wherein an upper end of the first non-expandable portion is disposed to be higher than an upper end of the third non-expandable portion, a lower end of the first non-expandable portion is disposed to be lower than a lower end of the third non-expandable portion, and an upper end of the second non-expandable portion is disposed to be lower than the upper end of the first non-expandable portion and the upper end of the third non-expandable portion, and disposed to be higher than the lower end of the first non-expandable portion and the lower end of the third non-expandable portion.

8. The curtain airbag apparatus of claim 1, wherein a length of the curtain airbag in a front and rear direction is longer than a length of the tether panel in the front and rear direction within a section where the tether panel is coupled to the curtain airbag.

9. The curtain airbag apparatus of claim 8, wherein the curtain airbag includes a folded portion that is folded so that the length of the curtain airbag in the front and rear direction becomes equal to the length of the tether panel in the front and rear direction within the section where the tether panel is coupled to the curtain airbag.

10. The curtain airbag apparatus of claim 9, wherein the folded portion includes:
- a first folded portion which is formed by bringing the other surfaces into direct contact with each other; and
- a second folded portion which extends from the first folded portion and is formed by bringing the one surface into direct contact with the one surface of the first folded portion.

\* \* \* \* \*